US011286035B2

(12) United States Patent
Lin (10) Patent No.: US 11,286,035 B2
(45) Date of Patent: Mar. 29, 2022

(54) PROPULSION DEVICE WITH DOUBLE-LAYER FLOW GUIDING ASSEMBLY AND FLIGHT VEHICLE USING THE SAME

(71) Applicant: Yao-Chang Lin, Hsinchu (TW)

(72) Inventor: Yao-Chang Lin, Hsinchu (TW)

( * ) Notice: Subject to any disclaimer, the term of this patent is extended or adjusted under 35 U.S.C. 154(b) by 131 days.

(21) Appl. No.: 16/924,218

(22) Filed: Jul. 9, 2020

(65) Prior Publication Data

US 2021/0394887 A1 Dec. 23, 2021

(30) Foreign Application Priority Data

Jun. 17, 2020 (TW) .................................. 109120418

(51) Int. Cl.
*B64C 9/38* (2006.01)
*B64C 9/06* (2006.01)
*B64C 9/02* (2006.01)

(52) U.S. Cl.
CPC .................. *B64C 9/38* (2013.01); *B64C 9/02* (2013.01); *B64C 9/06* (2013.01)

(58) Field of Classification Search
CPC .......... B64D 33/04; B64D 27/18; F02K 1/002
See application file for complete search history.

(56) References Cited

U.S. PATENT DOCUMENTS

| 2,871,656 | A | * | 2/1959 | Johnson | ..................... | F02K 1/76 |
| | | | | | | 60/230 |
| 4,809,932 | A | * | 3/1989 | Muller | ..................... | B64C 15/02 |
| | | | | | | 244/52 |
| 7,472,863 | B2 | * | 1/2009 | Pak | ..................... | A63H 27/14 |
| | | | | | | 244/12.5 |
| 9,067,676 | B1 | * | 6/2015 | Hethcock | ................. | B64C 27/82 |
| 10,538,311 | B2 | * | 1/2020 | Halcom | ................. | B64C 11/001 |
| 2007/0119151 | A1 | * | 5/2007 | McAllister | ............. | F02K 1/1207 |
| | | | | | | 60/230 |
| 2008/0105781 | A1 | * | 5/2008 | Belleville | .............. | B64C 11/001 |
| | | | | | | 244/51 |
| 2015/0274292 | A1 | * | 10/2015 | DeLorean | ................ | B64C 39/04 |
| | | | | | | 244/6 |
| 2018/0334243 | A1 | * | 11/2018 | Lin | ........................ | B64C 11/001 |
| 2018/0334252 | A1 | * | 11/2018 | Lin | ........................ | B64C 39/026 |
| 2019/0170087 | A1 | * | 6/2019 | Lin | .......................... | F02K 1/004 |

* cited by examiner

*Primary Examiner* — Philip J Bonzell
*Assistant Examiner* — Tye William Abell (57) ABSTRACT

A propulsion device with double-layer flow guiding assembly and a flight vehicle using the same are provided. The propulsion device includes a propulsion body, a first-layer flow guiding assembly and a second-layer flow guiding assembly. The propulsion body includes a housing, an airflow suction port and an airflow discharge port. The first-layer flow guiding assembly includes a front flow guiding ring and at least one first-layer flow guiding plate. The front flow guiding ring is disposed outside the airflow discharge port and has a first axis. The front flow guiding ring swings relative to the airflow discharge port along a first rotation axis. The first rotation axis intersects the first axis. The first-layer flow guiding plate is fixed in the front flow guiding ring and extends along the first rotation axis. The second-layer flow guiding assembly has a structure similar to the first-layer flow guiding assembly.

10 Claims, 7 Drawing Sheets

PROPULSION DEVICE WITH DOUBLE-LAYER FLOW GUIDING ASSEMBLY AND FLIGHT VEHICLE USING THE SAME

FIELD OF THE INVENTION

The present invention relates to a propulsion device and a flight vehicle using the same, and more particularly to a propulsion device with double-layer flow guiding assembly and a flight vehicle using the same.

BACKGROUND OF THE INVENTION

Some light-weight flight vehicles are provided with a turbo propulsion device on the wings and can fly by jet airflow. By rotating the entire turbo propulsion device to change the direction of the jet airflow, the flight vehicle can make actions such as turning, climbing or descending in the air to change the direction of flight. However, rotating the turbo propulsion device requires a large amount of force due to that the turbo propulsion device usually has a large mass. Further, the mechanical structure that rotates the entire turbo propulsion device is usually quite complicated. In this way, the energy consumption of the flight vehicle is increased.

SUMMARY OF THE INVENTION

The present invention provides a propulsion device with a double-layer flow guiding assembly and a flight vehicle using the same, which have a simple design and can reduce energy loss.

The propulsion device provided by the present invention is suitable for a flight vehicle. The propulsion device includes a propulsion body, a first-layer flow guiding assembly and a second-layer flow guiding assembly. The propulsion body includes a housing with a propulsion fan disposed in the housing, an airflow suction port and an airflow discharge port. The airflow suction port and the airflow discharge port are respectively located on opposite sides of the housing. The first-layer flow guiding assembly includes a front flow guiding ring and at least one first-layer flow guiding plate. The front flow guiding ring is disposed outside the airflow discharge port and has a first axis. The front flow guiding ring is adapted to swing relative to the airflow discharge port along a first rotation axis. The first rotation axis intersects the first axis. The at least one first-layer flow guiding plate is fixed in the front flow guiding ring and extends along the first rotation axis. The second-layer flow guiding assembly includes a rear flow guiding member and at least one second-layer flow guiding plate. The rear flow guiding member is disposed on a side of the front flow guiding ring opposite to the airflow discharge port. The front flow guiding ring is located between the rear flow guiding member and the airflow discharge port. The rear flow guiding member has a second axis coaxial with the first axis. The rear flow guiding member is adapted to swing relative to the airflow discharge port along a second rotation axis. The second rotation axis intersects the second axis, and the first rotation axis and the second rotation axis are not parallel to each other. The at least one second-layer flow guiding plate is fixed in the rear flow guiding member and extends along the second rotation axis.

In an embodiment of the present invention, a rotation axis of the first-layer flow guiding assembly and a rotation axis of the second-layer flow guiding assembly are perpendicular to each other.

In an embodiment of the present invention, the first-layer flow guiding assembly further includes a first inner flow guiding member and a first connecting rod disposed in the front flow guiding ring. The first connecting rod is in a plate shape. The first inner flow guiding member is concentrically arranged with the front flow guiding ring. The first connecting rod connects the front flow guiding ring and the first inner flow guiding member, passes through the first axis, and connects an inner wall of the front flow guiding ring at opposite ends thereof.

In an embodiment of the present invention, the second-layer flow guide assembly further includes a second inner flow guiding member and a second connecting rod disposed in the rear flow guiding member. The second connecting rod is in a plate shape. The second inner flow guiding member is concentrically arranged with the rear flow guiding member. The second connecting rod connects the rear flow guiding member and the second inner flow guiding member, passes through the second axis, and connects an inner wall of the rear flow guiding member at opposite ends thereof.

In an embodiment of the present invention, a shape of the airflow discharge port is circular, and a width of the airflow discharge port is equal to or greater than the front flow guiding ring and the rear flow guiding member.

In an embodiment of the present invention, a width of the front flow guiding ring is greater than a width of the rear flow guiding member.

In an embodiment of the present invention, the first-layer flow guiding assembly further includes two connecting portions opposite to each other. The two connection portions protrude toward the second-layer flow guiding assembly and are respectively connected to an outer wall of the rear flow guiding member.

In an embodiment of the present invention, the propulsion device further includes two connecting members respectively disposed between an outer wall of the front flow guiding ring of the first-layer flow guiding assembly and the housing and connected to the front flow guide ring and the housing.

In an embodiment of the present invention, the propulsion device further includes a first driving member and a second driving member. The first driving member is disposed outside the front flow guiding ring and includes a first rotating unit connected to the front flow guiding ring. The first driving member is suitable for driving the front flow guiding ring to swing. The second driving member is disposed outside the rear flow guiding member and includes a second rotating unit connected to the rear flow guiding member. The second driving member is suitable for driving the rear flow guiding member to swing.

The flight vehicle provided by the present invention includes a vehicle body, a wing, and the aforementioned propulsion device. The wing is disposed on the vehicle body, and the propulsion device is disposed under the wing.

The propulsion device of the embodiment of the present invention includes a first-layer flow guiding assembly and a second-layer flow guiding assembly, wherein the first-layer flow guiding assembly is suitable for swinging relative to the airflow discharge port along the first rotation axis, the second-layer flow guiding assembly is suitable for swinging relative to the airflow discharge port along the second rotation axis, and the first rotation axis and the second rotation axis are not parallel to each other. Therefore, the respective swings of the first-layer flow guiding assembly and the second-layer flow guiding assembly can make the jet airflow more efficient, thereby reducing energy loss.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
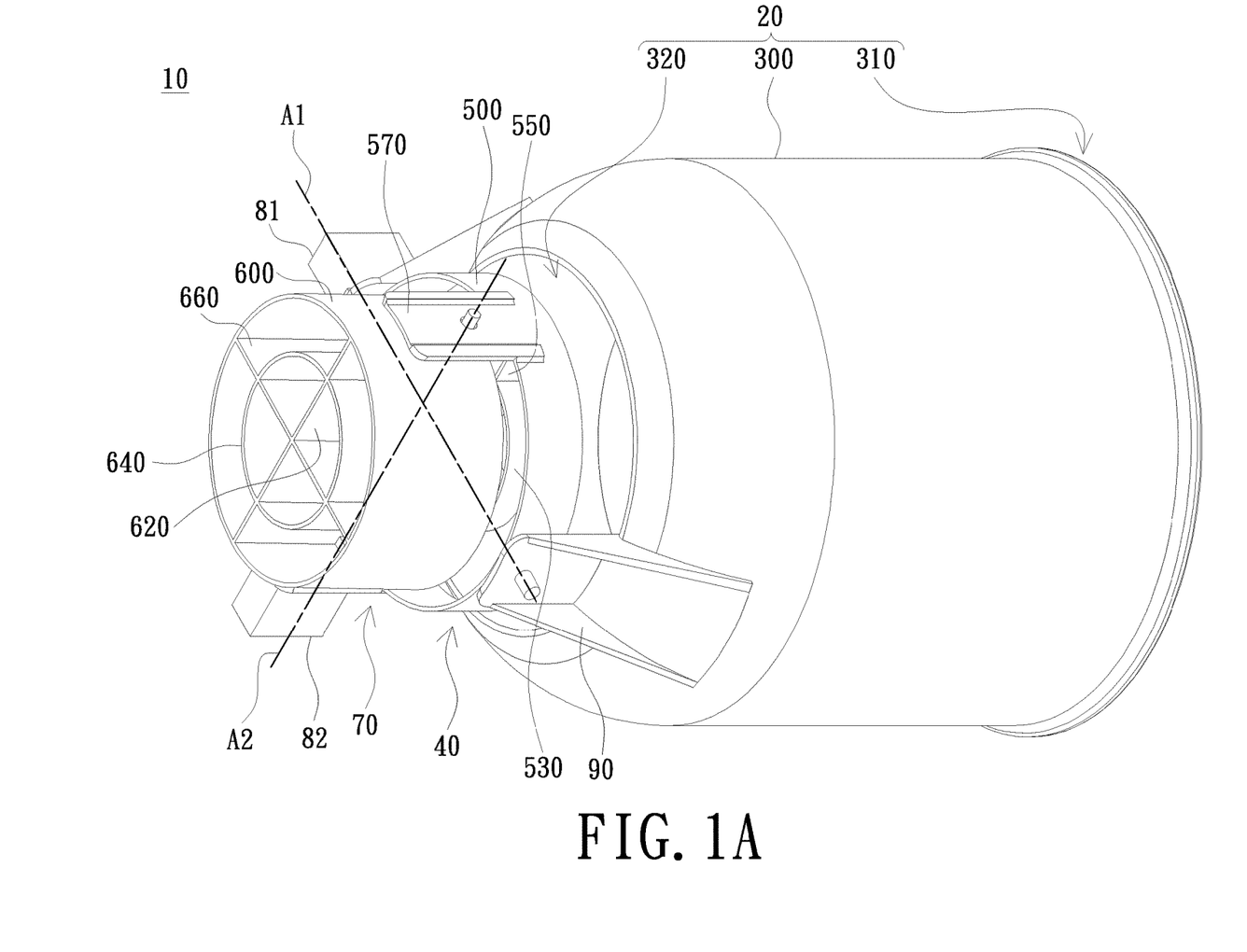
FIG. 1A is a schematic perspective view of a propulsion device according to an embodiment of the invention.
Figure 1B:
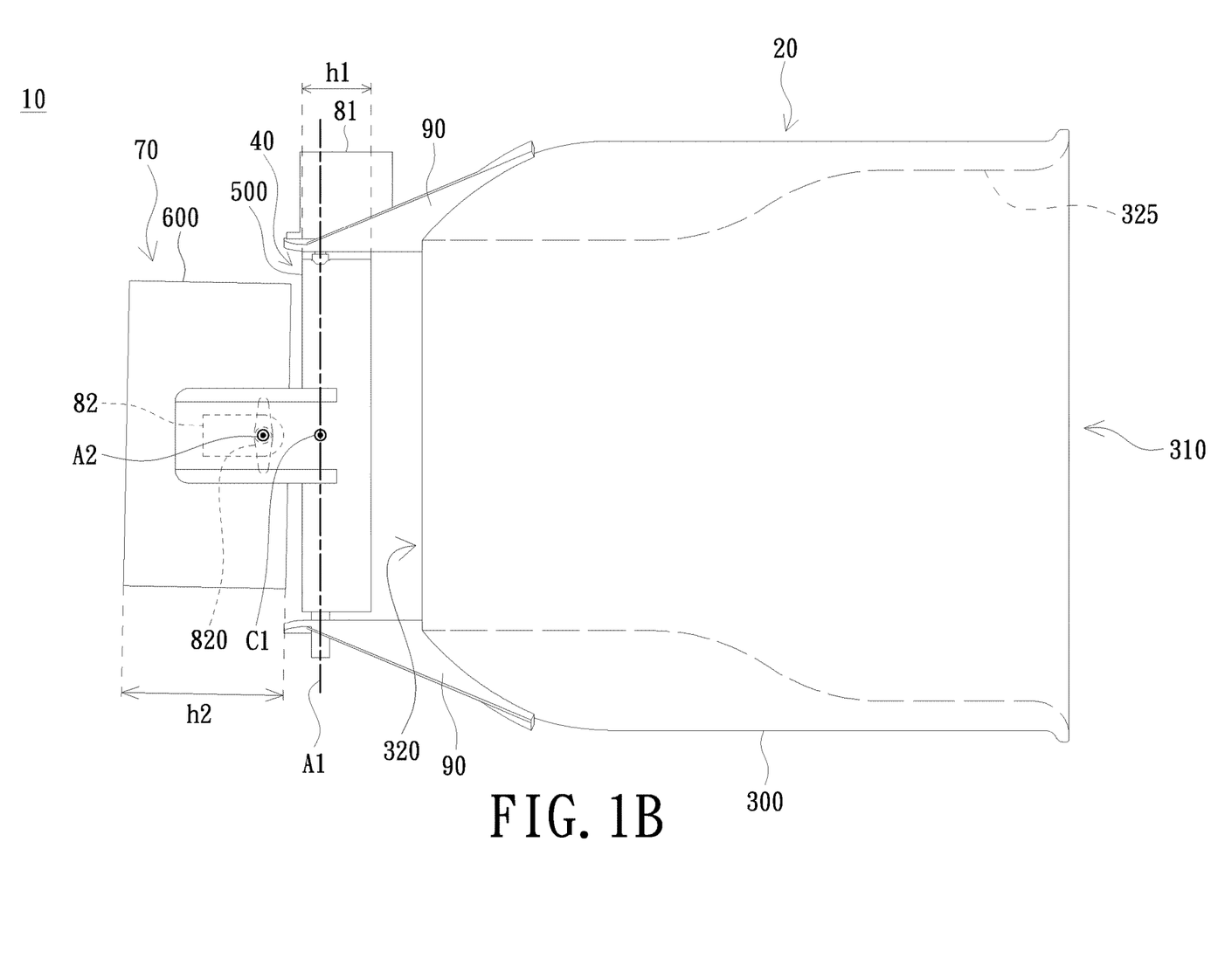
FIG. 1B is a schematic top view of the propulsion device shown in FIG. 1A.

The present invention provides a propulsion device with a double-layer flow guiding assembly, wherein the propulsion device is suitable for a flight vehicle. FIG. 1A is a schematic perspective view of a propulsion device according to an embodiment of the invention. As shown in FIG. 1A, the propulsion device 10 of the embodiment includes a propulsion body 20, a first-layer flow guiding assembly 40 and a second-layer flow guiding assembly 70. The propulsion body 20 includes a housing 300, an airflow suction port 310 and an airflow discharge port 320. The airflow suction port 310 and the airflow discharge port 320 are located on opposite sides of the housing 300, respectively. FIG. 1B is a schematic top view of the propulsion device 10 shown in FIG. 1A, wherein the inner wall of the housing 300 is illustrated by dotted lines. The inner wall between the airflow suction port 310 and the airflow discharge port 320 forms a flow path 325. As shown in FIGS. 1A and 1B, the airflow suction port 310 and the airflow discharge port 320 are circular, and the flow path 325 is gradually tapered from the airflow suction port 310 to the airflow discharge port 320, thereby facilitating the formation of high-speed jet airflow. However, the present invention does not limit the shapes of the flow path 325, the airflow suction port 310 and the airflow discharge port 320.

The propulsion device 10 may further include a propulsion fan (not shown) disposed in the propulsion body 20. Further, the propulsion device 10 may include a propulsion fan disposed at the airflow suction port 310 of the housing 300 and another propulsion fan disposed at the airflow discharge port 320 to generate propulsion force.

Figure 1C:
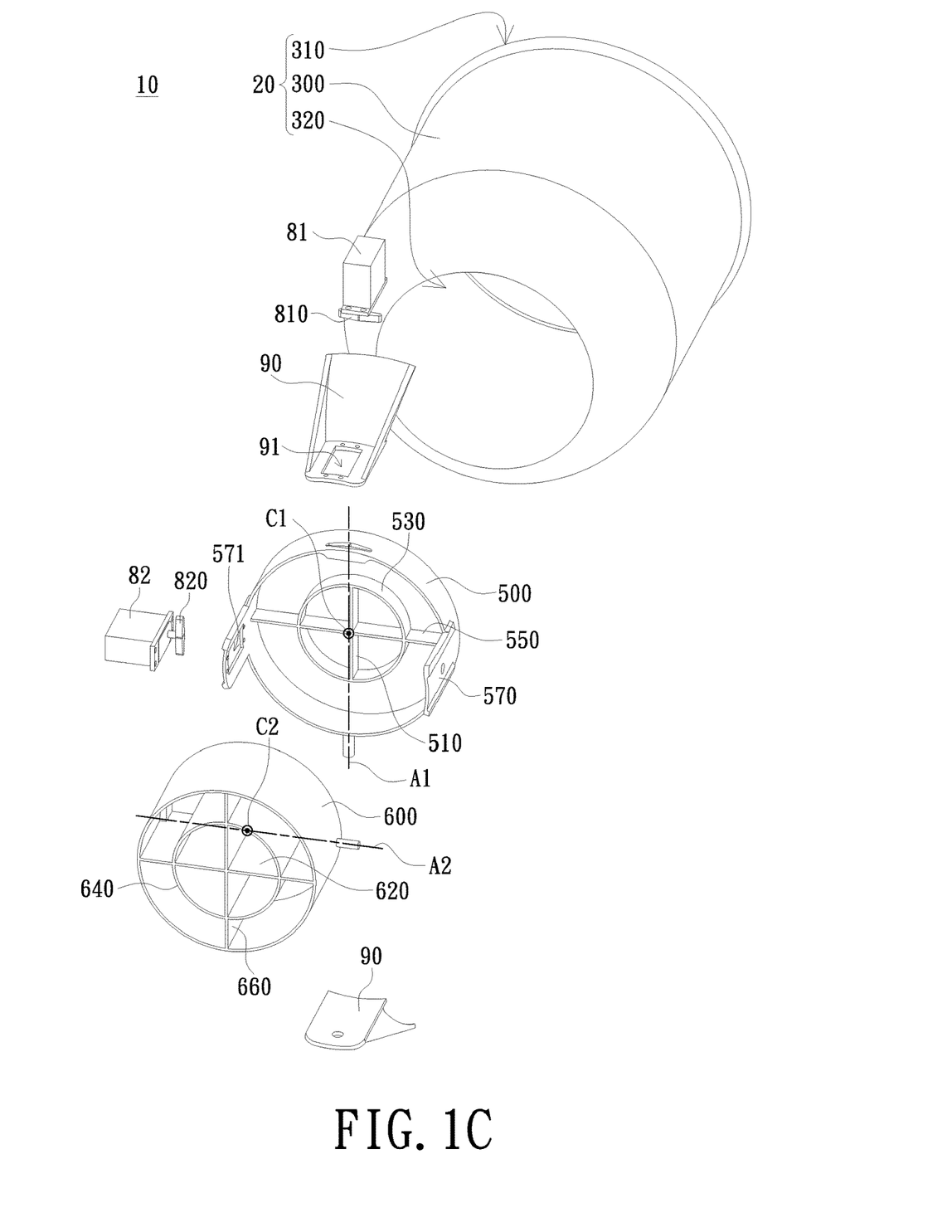
FIG. 1C is a schematic exploded view of the propulsion device shown in FIG. 1A.

FIG. 1C is a schematic exploded view of the propulsion device 10 shown in FIG. 1A. As shown in FIG. 1C, the first-layer flow guiding assembly 40 is disposed outside the airflow discharge port 320 and can be used to adjust the jet airflow. The first-layer flow guiding assembly 40 includes a front flow guiding ring 500 and at least one first-layer flow guiding plate 510, wherein the at least one first-layer flow guiding plate 510 is fixed in the front flow guiding ring 500.

The front flow guiding ring 500 is disposed outside the airflow discharge port 320. The front flow guiding ring 500 is specifically a cylindrical ring structure and has a first axis C1. In this embodiment, the first axis C1 is substantially aligned with the center (not shown) of the airflow discharge port 320. The width of the front flow guiding ring 500 is preferably not greater than the width of the airflow discharge port 320, and the front flow guiding ring 500 and the airflow discharge port 320 may correspond to each other and have the same shape. In this embodiment, the diameter of the front flow guiding ring 500 is slightly smaller than the diameter of the airflow discharge port 320. The front flow guiding ring 500 and the first-layer flow guiding plate 510 fixed therein can swing relative to the airflow discharge port 320. Further, the front flow guiding ring 500 of the embodiment swings along the first rotation axis A1, wherein the first rotation axis A1 and the first axis C1 intersect. The first-layer flow guiding plate 510 extends along the first rotation axis A1, and the plane where the first-layer flow guiding plate 510 is located may be consistent with the direction of the height h1 of the cylindrical ring structure.

The propulsion device 10 of the embodiment further includes a first inner flow guiding member 530. As shown in FIG. 1C, the first inner flow guiding member 530 is disposed in the front flow guiding ring 500. The first inner flow guiding member 530 may be an annular member, which is disposed concentrically with the front flow guiding ring 500 and is connected to the front flow guiding ring 500 by the first connecting rod 550. The first connecting rod 550 may be in a plate shape, and the plane where the rod plate is located may be located in the direction of the height h1 of the cylindrical ring structure. The first connecting rod 550 can further pass through the first axis C1 and be connected to the inner wall of the front flow guiding ring 500 at opposite ends. The first connecting rod 550 and the first-layer flow guiding plate 510 can be orthogonal to each other to have a cross structure.

The second-layer flow guiding assembly 70 is disposed on the side of the first-layer flow guiding assembly 40 opposite to the airflow discharge port 320, that is, the first-layer flow guiding assembly 40 is located between the second-layer flow guiding assembly 70 and the airflow discharge port 320. The second-layer flow guiding assembly 70 includes a rear flow guiding member 600 and at least one second-layer flow guiding plate 620, wherein the at least one second-layer flow guiding plate 620 is fixed in the rear flow guiding member 600. The rear flow guiding member 600 and the second-layer flow guiding plate 620 fixed therein can also swing relative to the airflow discharge port 320. Further, the rear flow guiding member 600 swings along the second rotation axis A2, wherein the second rotation axis A2 intersects with the second axis C2 of the rear flow guiding member 600, the second axis C2 is coaxial with the first axis C1, and the second rotation axis A2 and the first rotation axis A1 are not parallel to each other. The second rotation axis A2 may be orthogonal to the first rotation axis A1, but the invention is not limited thereto.

In the embodiment shown in FIGS. 1A to 1C, the rear flow guiding member 600 has a cylindrical ring structure, and the second axis C2 is located on the ring center of the cylindrical ring structure. The diameter of the rear flow guiding member 600 is slightly smaller than the diameter of the front flow guiding ring 500, but the invention is not limited thereto. The at least one second-layer flow guiding plate 620 extends along the second rotation axis A2, and the plane where the second-layer flow guiding plate 620 is located is also located in the direction of the height h2 of the cylindrical ring structure of the rear flow guiding member 600.

The propulsion device 10 of the embodiment further includes a second inner flow guiding member 640. As shown in FIG. 1C, the second inner flow guiding member 640 is disposed in the rear flow guiding member 600. The second inner flow guiding member 640 may be an annular member, which is disposed concentrically with the rear flow guiding member 600 and is connected to the rear flow guiding member 600 by the second connecting rod 660. The second connecting rod 660 may be in a plate shape, and the plane where the rod plate is located may be located in the direction of the height h2 of the annular member. The second connecting rod 660 can further pass through the second axis C2 and be connected to the inner wall of the rear flow guiding member 600 at opposite ends. The second connecting rod 660 and the second-layer flow guiding plate 620 can be orthogonal to each other to have a cross structure.

In summary, the first-layer flow guiding assembly 40 and the second-layer flow guiding assembly 70 are sequentially arranged outside the airflow discharge port 320 and both can adjust the jet airflow from the propulsion body 20. Therefore, on the one hand, the flight vehicle can fly in a predetermined direction and the jet airflow can be used more efficiently; on the other hand, the first-layer flow guiding assembly 40 and the second-layer flow guiding assembly 70 can swing respectively along different rotation axes, so the first-layer flow guiding assembly 40 and the second-layer flow guiding assembly 70 can be regulated separately and coordinately produce the adjustment effect on the jet airflow, thereby generating a more sensitive control effect.

The first-layer flow guiding assembly 40 of the embodiment further includes a connecting portion 570. As shown in FIGS. 1A to 1C, two connecting portions 570 are disposed on the front flow guiding ring 500, face each other, protrude toward the second-layer flow guiding assembly 70, and are respectively connected to the outer wall of the rear flow guiding member 600. The connecting portion 570 may be, for example, a plate member disposed on the outer wall of the cylindrical ring structure and connected to the rear flow guiding member 600. The connecting portion 570 and the rear flow guiding member 600 can be fixed to each other by conventional means.

The propulsion device 10 of the embodiment may further include a connecting member 90. Preferably, at least two connecting members 90 are respectively disposed between the outer wall of the front flow guiding ring 500 of the first-layer flow guiding assembly 40 and the housing 300 and connected to the front flow guiding ring 500 and the housing 300. The connecting member 90 is generally Y-shaped, disposed at the edge of the airflow discharge port 320 in a sandwiched manner, and connected to the inner wall and the outer wall of the housing 300 and the outer wall of the front flow guiding ring 500. The positions of the two connecting members 90 on the front flow guiding ring 500 and the positions of the connecting portions 570 may be alternate, so the balance and stability between the front flow guiding ring 500, the rear flow guiding member 600 and the housing 300 can be achieved. In this embodiment, the two connecting members 90 are further arranged along the first rotation axis A1, and the two connecting portions 570 are arranged along the second rotation axis A2, so that the connecting portion 570 and the connecting member 90 are arranged at every 90 degree interval on the front flow guiding ring 500, thereby helping to improve the stability.

The propulsion device 10 of the embodiment further includes a first driving member 81 and a second driving member 82, which are respectively adapted to drive the swinging of the first-layer flow guiding assembly 40 and the second-layer flow guiding assembly 70. The first driving member 81 may be disposed outside the front flow guiding ring 500 and has a first rotating unit 810 connected to the front flow guiding ring 500. The second driving member 82 may be disposed outside of the rear flow guiding member 600 and has a second rotating unit 820 connected to the rear flow guiding member 600. The first driving member 81 and the second driving member 82 can be controlled by the flight control system of the flight vehicle. The first driving member 81 and the second driving member 82 are, for example, motors. The first rotating unit 810 and the second rotating unit 820 have a rotor-like structure, for example, and can be directly driven by the motor.

The first driving member 81 may be further disposed on the connecting member 90, and the second driving member 82 may be further disposed on the connecting portion 570. The connecting member 90 and the connecting portion 570 may be provided with holes 91 and 571 respectively, for allowing the first rotating unit 810 to extend out of the connecting member 90 and the second rotating unit 820 to extend out of the connecting portion 570 to be connected to the front flow guiding ring 500 and the rear flow guiding member 600, respectively. The rotation centers of the first rotating unit 810 and the second rotating unit 820 may be located on the first rotation axis A1 and the second rotation axis A2, respectively. In other words, the connecting member 90 defines the first rotation axis A1 and fixes the front flow guiding ring 500 at the first rotation axis A1 to be driven to swing by the first rotating unit 810. The connecting portion 570 defines the second rotation axis A2 and fixes the rear flow guiding member 600 at the second rotation axis A2 to be driven to swing by the second rotating unit 820.

Figure 2A:
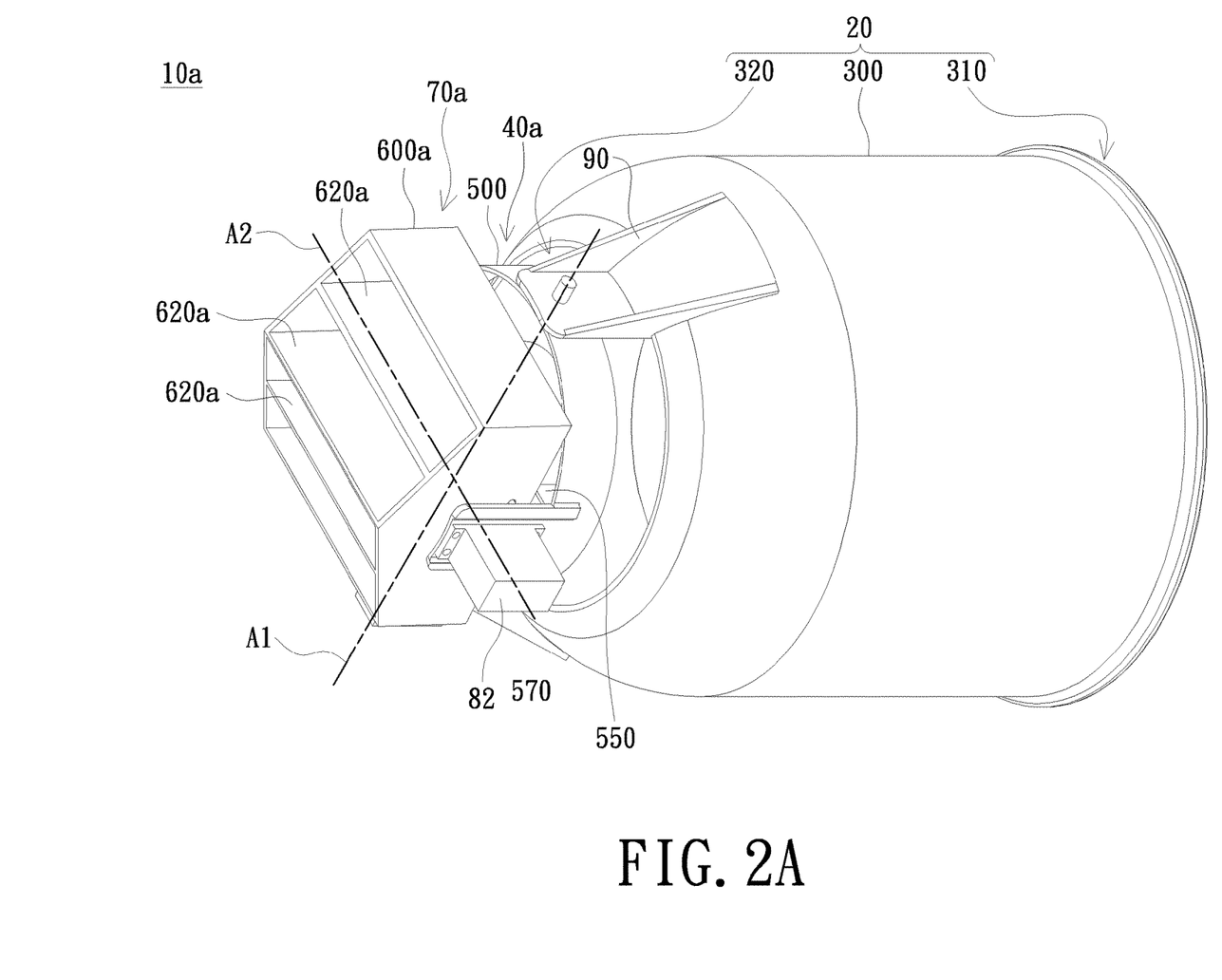
FIG. 2A is a schematic perspective view of a propulsion device according to another embodiment of the invention.
Figure 2B:
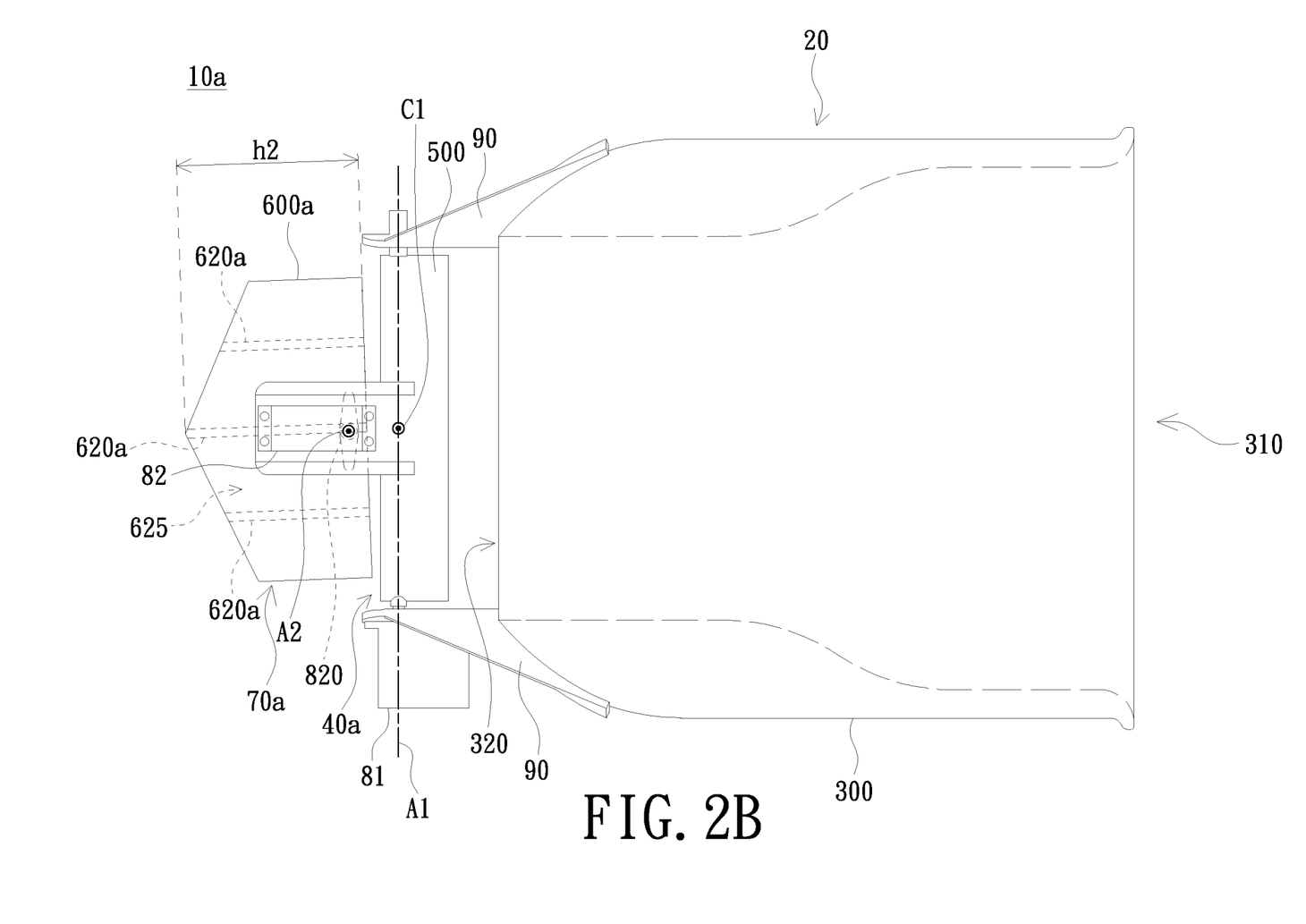
FIG. 2B is a schematic side view of the propulsion device shown in FIG. 2A.

FIG. 2A is a schematic perspective view of a propulsion device according to another embodiment of the invention. FIG. 2B is a schematic side view of the propulsion device shown in FIG. 2A. The difference from the embodiment shown in FIGS. 1A to 1C is that the rear flow guiding member 600a of the second-layer flow guiding assembly 70a of the propulsion device 10a of the embodiment is substantially rectangular box-shaped, and the second rotation axis A2 is located between opposite sides of the rectangle. The propulsion device 10a includes a plurality of second-layer flow guiding plates 620a parallel to the second rotation axis A2 and fixed in the rear flow guiding member 600a. The plane where each second-layer flow guiding plate 620a is located is consistent with the direction of the height h2 of the rectangular box.

The second rotation axis A2 may be further located in the middle of the two opposite long sides of the rectangle, and the height of the second-layer flow guiding plate 620a decreases as the distance from the second rotation axis A2 increases. As shown in FIG. 2B, the rear flow guiding member 600a may have a roof shape on the side opposite to the front flow guiding ring 500. The rear flow guiding member 600a with the roof shape and the plurality of second-layer flow guiding plates 620a therein divide the space in the rear flow guiding member 600a into a plurality of flow paths 625. The length of the flow path 625 decreases from the center toward both sides.

In other embodiments, a propulsion device may further include a third-layer flow guiding assembly (not shown).

The third-layer flow guiding assembly may include a flow guiding member and a flow guiding plate. The flow guiding plate may specifically approximate the first-layer flow guiding plate 510 or the second-layer flow guiding plate 620, and the flow guiding member may specifically approximate the front flow guiding ring 500, the rear flow guiding member 600 or 600a. For example, the propulsion device 10 may further include a third-layer flow guiding assembly composed of a rectangular box-shaped flow guiding member and a plurality of flow guiding plates, and the propulsion device 10a may further include a third-layer flow guiding assembly composed of an annular flow guiding member and at least one flow guiding plate. The third-layer flow guiding assembly can be adapted to swing relative to the airflow discharge port along the third rotation axis, and the third rotation axis is preferably not parallel to the first rotation axis A1 and the second rotation axis A2.

Figure 3A:
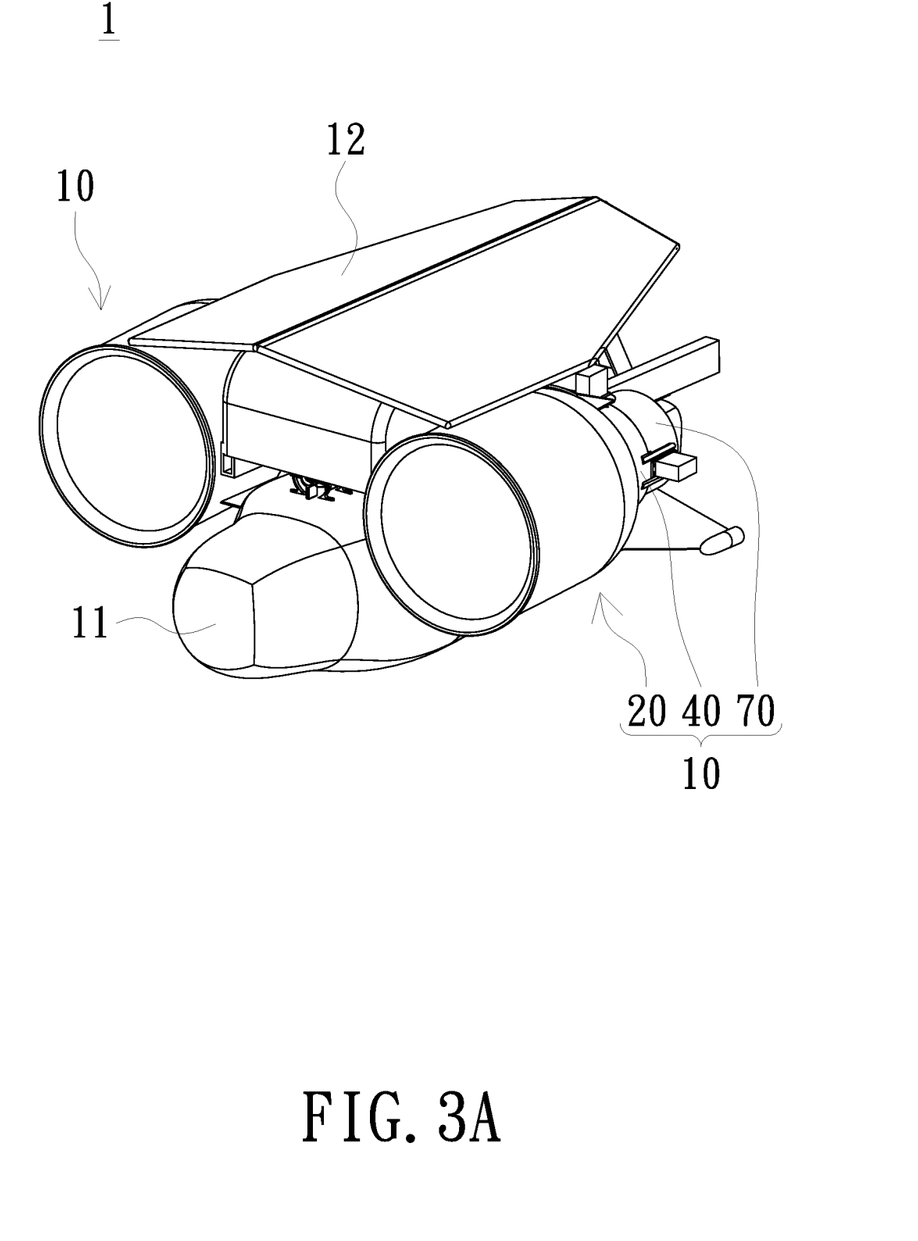
FIG. 3A is a schematic perspective view of a flight device according to an embodiment of the invention.
Figure 3B:
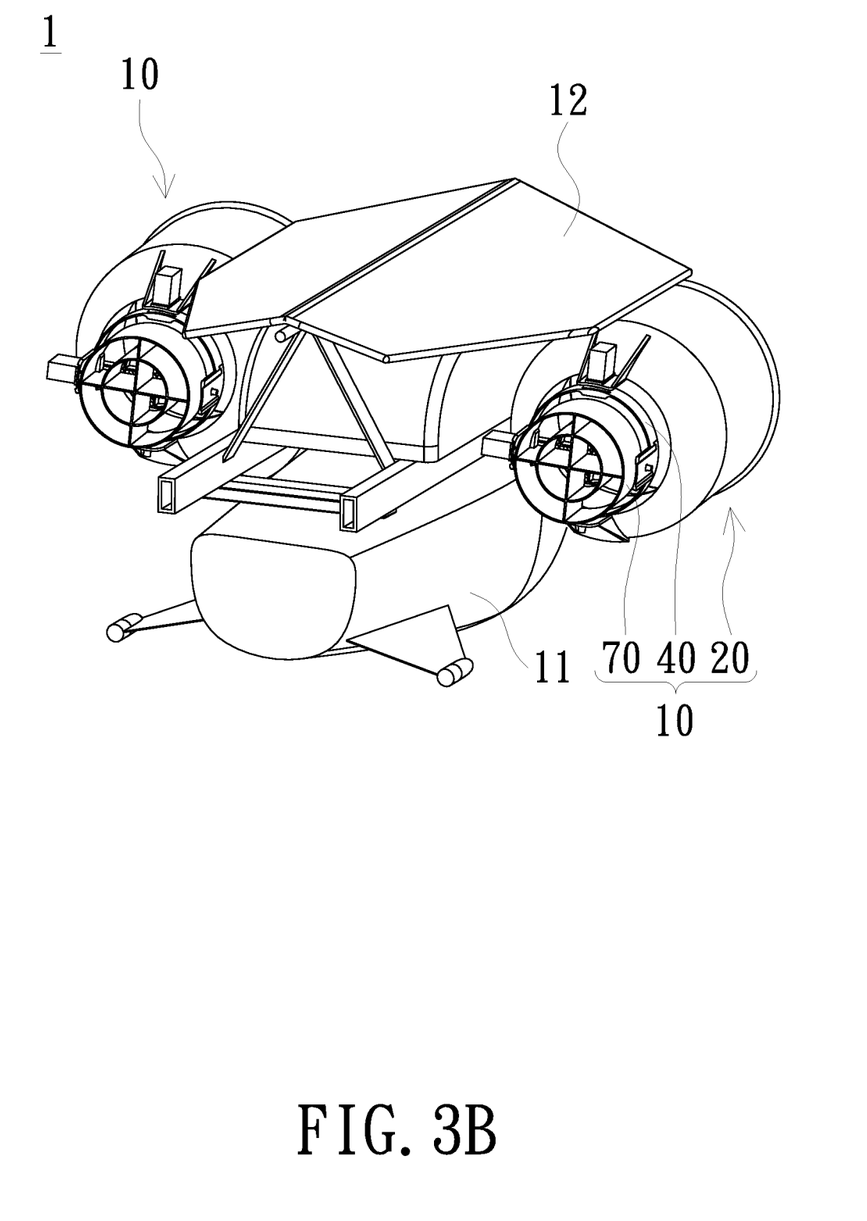
FIG. 3B is a schematic perspective view of the flight device shown in FIG. 3A viewed from another angle.

The present invention also provides a flight vehicle. FIG. 3A is a schematic perspective view of a flight vehicle according to an embodiment of the invention. FIG. 3B is a schematic perspective view of the flight vehicle shown in FIG. 3A, viewed from another angle. As shown in FIGS. 3A and 3B, the flight vehicle 1 of the embodiment includes a vehicle body 11, a wing 12 and the propulsion device 10. The wing 12 is disposed on the vehicle body 11, and the propulsion device 10 is disposed under the wing 12, wherein the wing 12 may be a roof-shape wing. Because the front flow guiding ring 500 and the rear flow guiding member 600 of the propulsion device 10 can be regulated separately and coordinately produce the adjustment effect on the jet airflow, the airflow control is more sensitive, which helps to improve the performance of the flight vehicle 1 and reduce energy loss. The flight vehicle 1 may also be equipped with other propulsion devices of the present invention, such as the propulsion device 10a.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A propulsion device with a double-layer flow guiding assembly and suitable for a flight vehicle, comprising:
   a propulsion body, comprising a housing with a propulsion fan disposed in the housing, an airflow suction port and an airflow discharge port, wherein the airflow suction port and the airflow discharge port are respectively located on opposite sides of the housing;
   a first-layer flow guiding assembly, comprising:
      a front flow guiding ring, disposed outside the airflow discharge port of the housing and having a first axis, wherein the front flow guiding ring is adapted to swing relative to the airflow discharge port along a first rotation axis, and the first rotation axis intersects the first axis; and
      at least one first-layer flow guiding plate, fixed in the front flow guiding ring and extending along the first rotation axis; and
   a second-layer flow guiding assembly, comprising:
      a rear flow guiding member, disposed on a side of the front flow guiding ring opposite to the airflow discharge port, wherein the front flow guiding ring is located between the rear flow guiding member and the airflow discharge port, the rear flow guiding member has a second axis coaxial with the first axis, the rear flow guiding member is adapted to swing relative to the airflow discharge port along a second rotation axis, the second rotation axis intersects the second axis, and the first rotation axis and the second rotation axis are not parallel to each other; and
      at least one second-layer flow guiding plate, fixed in the rear flow guiding member and extending along the second rotation axis.

2. The propulsion device according to claim 1, wherein a rotation axis of the first-layer flow guiding assembly and a rotation axis of the second-layer flow guiding assembly are perpendicular to each other.

3. The propulsion device according to claim 1, wherein the first-layer flow guiding assembly further comprises a first inner flow guiding member and a first connecting rod disposed in the front flow guiding ring, the first connecting rod is in a plate shape, the first inner flow guiding member is concentrically arranged with the front flow guiding ring, the first connecting rod connects the front flow guiding ring and the first inner flow guiding member, passes through the first axis, and connects an inner wall of the front flow guiding ring at opposite ends thereof.

4. The propulsion device according to claim 1, wherein the second-layer flow guide assembly further comprises a second inner flow guiding member and a second connecting rod disposed in the rear flow guiding member, the second connecting rod is in a plate shape, the second inner flow guiding member is concentrically arranged with the rear flow guiding member, the second connecting rod connects the rear flow guiding member and the second inner flow guiding member, passes through the second axis, and connects an inner wall of the rear flow guiding member at opposite ends thereof.

5. The propulsion device according to claim 1, wherein a shape of the airflow discharge port is circular, and a width of the airflow discharge port is equal to or greater than the front flow guiding ring and the rear flow guiding member.

6. The propulsion device according to claim 1, wherein a width of the front flow guiding ring is greater than a width of the rear flow guiding member.

7. The propulsion device according to claim 1, wherein the first-layer flow guiding assembly further comprises two connecting portions opposite to each other, the two connection portions protrude toward the second-layer flow guiding assembly and are respectively connected to an outer wall of the rear flow guiding member.

8. The propulsion device according to claim 1, further comprising two connecting members respectively disposed between an outer wall of the front flow guiding ring of the first-layer flow guiding assembly and the housing and connected to the front flow guide ring and the housing.

9. The propulsion device according to claim 1, further comprising a first driving member and a second driving member, wherein the first driving member is disposed outside the front flow guiding ring and comprises a first rotating unit connected to the front flow guiding ring, the first driving member is suitable for driving the front flow guiding ring to swing, the second driving member is disposed outside the rear flow guiding member and comprises a second rotating unit connected to the rear flow guiding member, and the second driving member is suitable for driving the rear flow guiding member to swing.

10. A flight vehicle, comprising:
   a vehicle body;
   a wing, disposed on the vehicle body; and a propulsion device, disposed under the wing, and the propulsion device comprising:
  a propulsion body, comprising a housing with a propulsion fan disposed in the housing, an airflow suction port and an airflow discharge port, wherein the airflow suction port and the airflow discharge port are respectively located on opposite sides of the housing;
  a first-layer flow guiding assembly, comprising:
    a front flow guiding ring, disposed outside the airflow discharge port of the housing and having a first axis, wherein the front flow guiding ring is adapted to swing relative to the airflow discharge port along a first rotation axis, and the first rotation axis intersects the first axis; and
    at least one first-layer flow guiding plate, fixed in the front flow guiding ring and extending along the first rotation axis; and
  a second-layer flow guiding assembly, comprising:
    a rear flow guiding member, disposed on a side of the front flow guiding ring opposite to the airflow discharge port, wherein the front flow guiding ring is located between the rear flow guiding member and the airflow discharge port, the rear flow guiding member has a second axis coaxial with the first axis, the rear flow guiding member is adapted to swing relative to the airflow discharge port along a second rotation axis, the second rotation axis intersects the second axis, and the first rotation axis and the second rotation axis are not parallel to each other; and
    at least one second-layer flow guiding plate, fixed in the rear flow guiding member and extending along the second rotation axis.

\* \* \* \* \*